(No Model.)

S. BRAY.
Stock Car.

No. 241,600. Patented May 17, 1881.

Witnesses;
E. C. Perkins
W. R. Marble

Inventor;
Danford Bray
By Sylvenus Walker
Attorney

UNITED STATES PATENT OFFICE.

SANFORD BRAY, OF CHARLESTOWN, MASSACHUSETTS.

STOCK-CAR.

SPECIFICATION forming part of Letters Patent No. 241,600, dated May 17, 1881.

Application filed March 5, 1881. (No model.)

*To all whom it may concern:*

Be it known that I, SANFORD BRAY, of Charlestown, in the county of Suffolk and State of Massachusetts, have invented certain new and useful Improvements in Stock-Cars, of which the following is a specification.

The objects of my invention are to provide stock-cars so constructed that the stock may be arranged compactly and permitted to lie down and get up without the liability of being injured or trampled upon by others, and be fed and watered and kept separate from each other during transportation, and conveniently loaded and unloaded; and it consists in the construction, combination, and arrangement of the several devices employed in the invention, as hereinafter more fully described and set forth.

Figure 1:
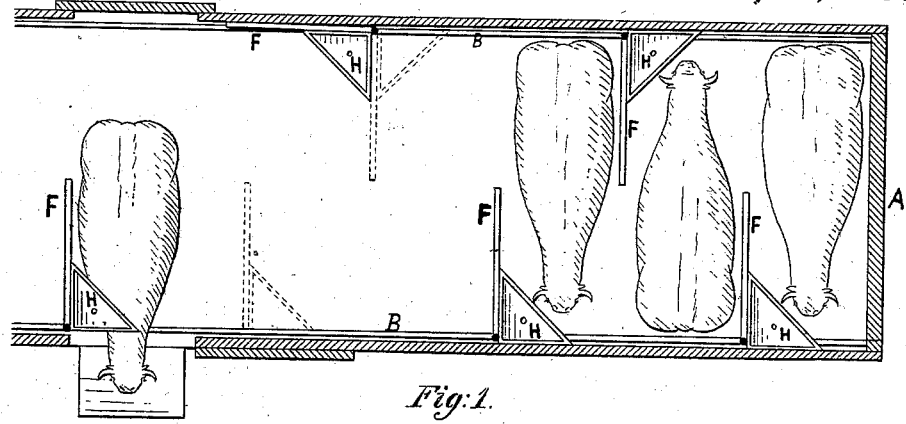
Figure 2:
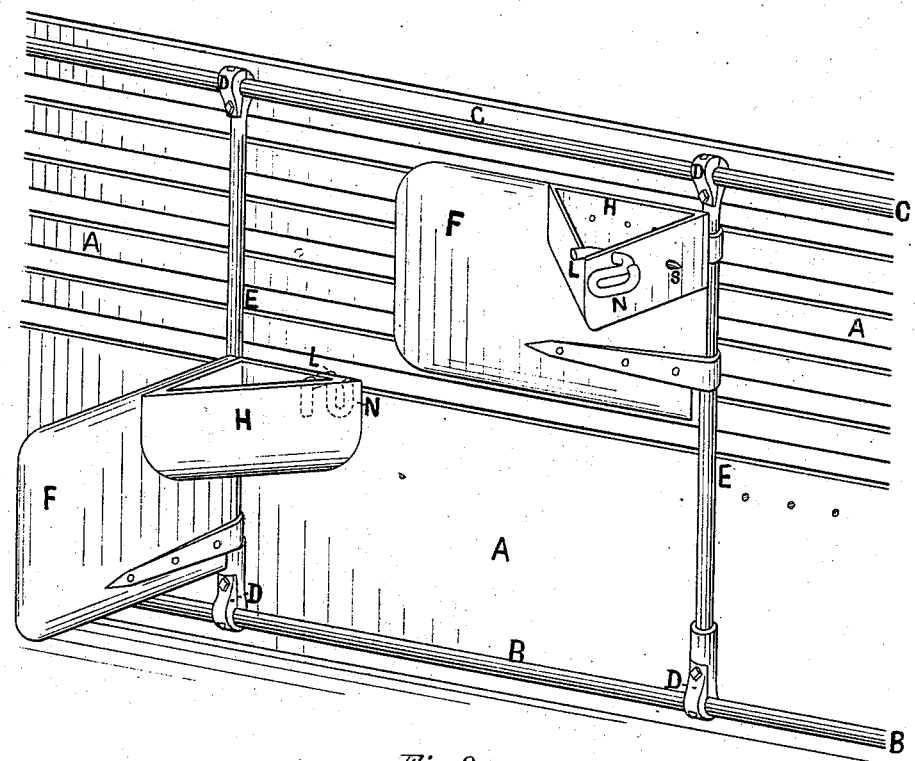

Figure 1 represents a horizontal section of a stock-car having my invention applied therein. Fig. 2 represents a perspective view, showing my invention applied to the interior of a car.

A represents the body of a car, of usual construction. Near the floor thereof, upon each side, is secured a longitudinal horizontal rod or bar, B, extending the length of the car-body and connected with the ends in any suitable manner.

C represents similar rods or bars, connected at each end near the top of the car and directly in line with the bottom ones.

E represents a series of vertical standards connected at top and bottom loosely with the said top and bottom bars, B and C, by a series of clamps, D, which embrace the said bars, and are adapted to slide thereon freely. These clamps may be connected with the upper and lower ends of the vertical standards E in any suitable manner. Now, to these vertical standards E may be hinged the swinging gates or partitions F, which, when closed into position between the animals, extend to about the center of the width of the body of the car, and are arranged alternately upon opposite sides thereof, and may be slid in either direction longitudinally of the car-body, so as to enlarge or reduce the size of the compartment to correspond with that of the animal placed therein. Each gate or partition F is provided with a triangular feed-trough, H, secured thereto in such position as to have a bearing at one of its sides with or against the side of the car-body when closed into position, whereby it serves as a brace to prevent the animal in the next compartment from forcing the said gate from its position, it being secured firmly, when closed, by a suitable rotating hook, L, one end of which passes through the brace end or side of the said feed-trough H, and bent at right angles, or in such manner as to extend or project so as to rest upon the upper edge of the trough, when its outer hooked end is disengaged from the side rail or other portion of the car-body, by means of a suitable loop or handle, N, as shown.

It will be seen that in loading or unloading the larger animals the several gates are opened or swung around against the sides of the car-body A, and then slid upward upon the said vertical standards E, which enables the animals or cattle to pass into or from the car without danger of contact with the bottoms of the feed-troughs, they being sufficiently elevated to permit them to pass freely beneath the same, as shown at the left-hand end of the view, Fig. 1.

The portion of the troughs which contact with the side of the car-body when the gates are closed may be provided with projecting pins S, which enter corresponding holes formed in the sides of the car-body to receive them, so as to prevent the stock in the compartments or pens from crowding against the gates, and thus slide them from their arranged positions.

Having thus described my invention, what I claim is—

1. In a stock-car, the combination of the horizontal rods B C and vertical standards E with the vertical and horizontal sliding hinged gates F, provided with feed-troughs H, having fastening-hooks L, substantially as described, as and for the purposes set forth.

2. In a stock-car, the vertical standards E, having the clamps D, in combination with the horizontal rods or bars B C and hinged gates F, provided with the feed-troughs H, and fastening-hooks L, provided with loop-handles N, substantially as described, as and for the purposes set forth.

SANFORD BRAY.

Witnesses:
SYLVENUS WALKER,
E. C. PERKINS.